Nov. 24, 1964
M. H. GROVE
3,158,352
CLAMPED GATE VALVE BODY
Filed Aug. 16, 1961
2 Sheets-Sheet 1
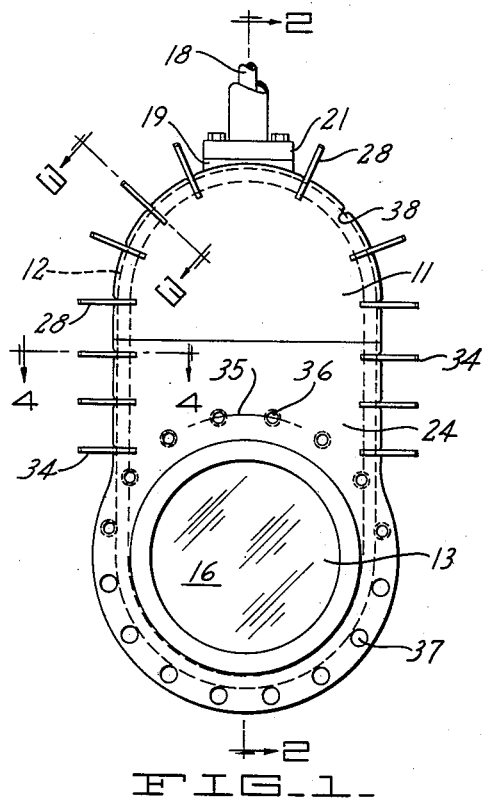
FIG_1_
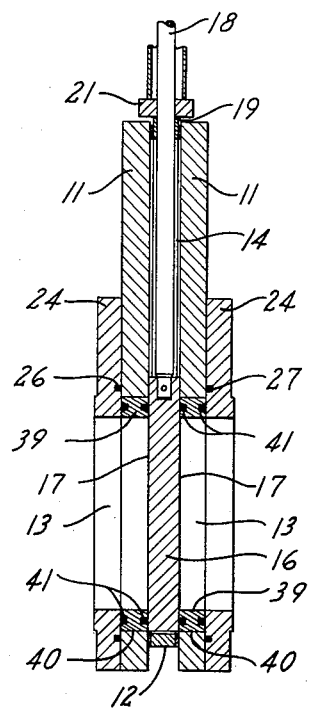
FIG_2_
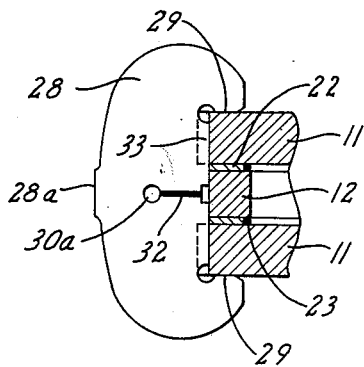
FIG_3_
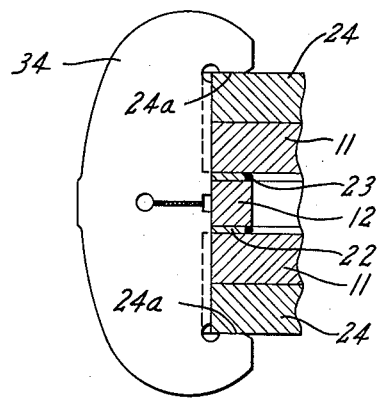
FIG_4_
INVENTOR.
Marvin H. Grove.
BY
*Flehr and Swain*
ATTORNEYS.

Nov. 24, 1964
M. H. GROVE
3,158,352
CLAMPED GATE VALVE BODY
Filed Aug. 16, 1961
2 Sheets-Sheet 2
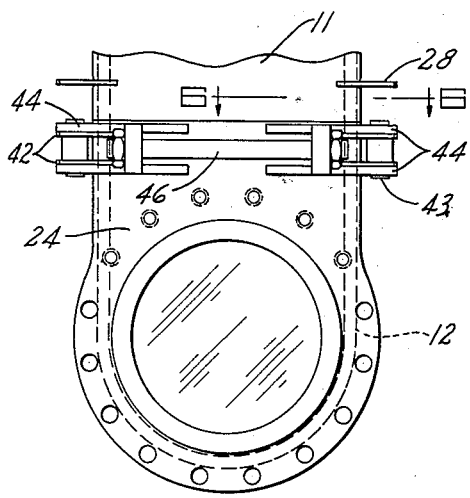
FIG_5_
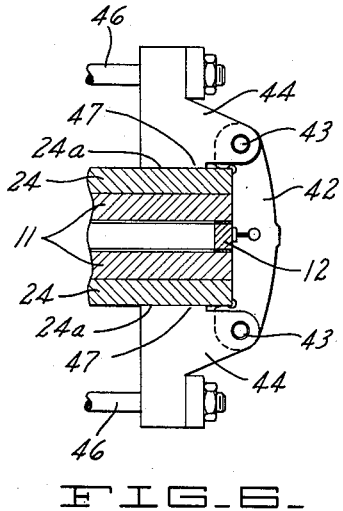
FIG_6_
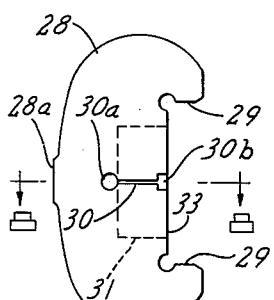
FIG_7_
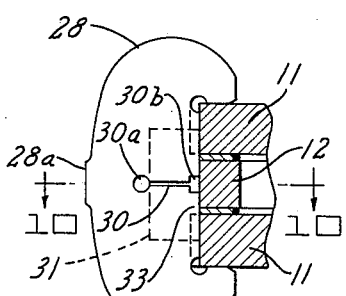
FIG_9_
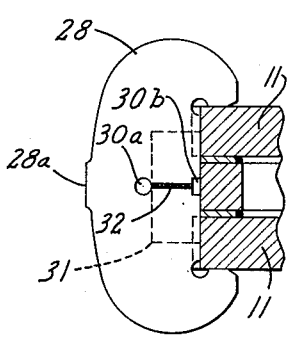
FIG_11_
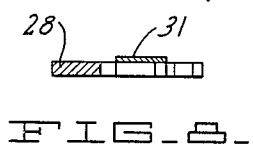
FIG_8_
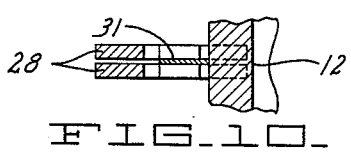
FIG_10_
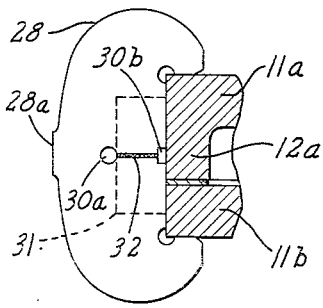
FIG_12_
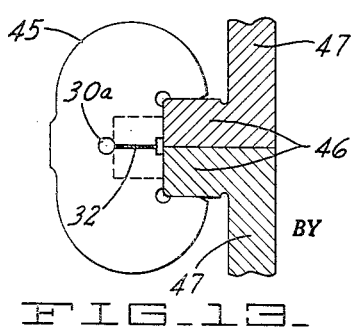
FIG_13_
INVENTOR.
Marvin H. Grove.
BY
ATTORNEYS.

United States Patent Office 3,158,352
Patented Nov. 24, 1964

3,158,352
CLAMPED GATE VALVE BODY
Marvin H. Grove, 340 Hillside Ave., Piedmont, Calif.
Filed Aug. 16, 1961, Ser. No. 131,804
2 Claims. (Cl. 251—329)

This invention relates generally to clamping devices and the construction of valve bodies and other pressure vessels making use of the same.

In the past, a variety of clamping devices have been used for various purposes, including such devices as bolts, studs, rivets, screw clamps and the like. In a typical instance where bolts are applicable, it is common to provide adjacent flanges or like parts that have drilled or spaced centers to receive the bolts. The same is true of studs and rivets. From the standpoint of manufacturing economy and compactness, such flanges require considerable metal, and this together with the maching operations required, adds considerably to manufacturing costs.

Instead of employing the more conventional integral castings, some pressure vessels, such as valve bodies, are made by fabricating or assembling various parts. For example, certain valve bodies are made of plate-like side parts, clamped upon an intermediate body part by bolts (see Leach et al. 1,780,828). While such a construction is practical, the cost of manufacture is not as favorable as may be desired, due largely to the machining and assembly operations involved, and to the amount of metal required for accommodating the clamping bolts.

In general it is an object of the invention to provide a clamping of novel construction that can be used in place of bolts and other conventional means for a wide variety of structures.

Another object of the invention is to provide a pressure vessel construction utilizing an assembled body and which has novel means for clamping the body parts together.

Another object of the invention is to provide a gate valve which is characterized by a novel and simple construction for maintaining a proper seal against line pressure between the body and the gate.

Additional objects of the invention would appear from the following description and with the preferred embodiments set forth in detail in conjunction with the accompanying drawing.

Referring to the drawing:

FIGURE 1 is a side elevational view illustrating a valve made in accordance with the present invention.

FIGURE 2 is a cross section taken along the line 2—2 of FIGURE 1.

FIGURE 3 is a large cross sectional detail taken along the line 3—3 of FIGURE 1.

FIGURE 4 is an enlarged cross sectional detail taken along the line 4—4 of FIGURE 1.

FIGURE 5 is a side elevational view like FIGURE 1, but showing another embodiment.

FIGURE 6 is a cross sectional detail taken along the line 6—6 of FIGURE 5.

FIGURE 7 is a side view in elevation illustrating one of the clamping devices before its application and before a welding operation.

FIGURE 8 is a cross sectional detail taken along the line 8—8 of FIGURE 7.

FIGURE 9 is a view like FIGURE 7 but illustrating the clamping device immediately after being applied to parts to be clamped together.

FIGURE 10 is a cross sectional detail taken along the line 10—10 of FIGURE 9.

FIGURE 11 is a view like FIGURE 9 after the welding operation.

FIGURE 12 is a cross sectional detail like FIGURE 3, but showing another valve body embodiment.

FIGURE 13 is a cross sectional detail like FIGURE 3, but showing application of the clamping device for purposes other than valve bodies.

My clamping device will first be described as applicable to valves, although it can be employed for a wide variety of purposes. Thus, the valve illustrated in FIGURES 1 and 2 consists of a body formed of rigid side plates 11, which may be duplicates, together with an intermediate body part 12. The side body parts 11 can be formed of flat mill-rolled steel or suitable metal or metal alloy, with a general oval configuration such as shown in FIGURE 1.

The aligned openings 13 in body form flow passages for making connection with associated piping. The intermediate body part 12, as viewed in FIGURE 1 conforms generally to the configuration of the side parts 11, or in other words, it is generally oval shape. It serves together with the side parts, to encompass the closed body space 14 that accommodates the valve gate 16.

The valve gate 16 is a flat slab or plate, having parallel side surfaces 17, and likewise may be formed of flat mill-rolled steel or suitable metal or metal alloy. Although a plain gate is illustrated, the valve may be constructed with a gate of the through port type. One end of the gate is shown attached to the operating stem 18, which extends through the bonnet block 19 and the exterior bonnet plate 21. Suitable sealing means, as for example, a conventional packing or one or more seal rings of the resilient O ring type, can be located within the bonnet block 19 to prevent leakage past the stem. The bonnet block can be formed as an integral part of the intermediate body 12.

Suitable means are provided for establishing fluid tight seals between the body parts. Thus in the embodiments illustrated, thin metal gaskets 22 are deposed between the ends of the intermediate body part 12 and the side body parts, thereby forming inner recesses for receiving the seal rings 23 of the O ring type. It will be evident that other sealing arrangements can be employed, such as sealing gaskets.

Supplemental metal plates 24 are positioned upon the sides of the body parts 11, and provide means to facilitate the attachement of piping flanges. Suitable means are provided for sealing against leakage between the body parts 11 and plates 24. In the embodiment illustrated, a circular recess 26 is formed in the face of one of these parts, and serves to receive the seal ring 27 of the resilient O ring type.

The novel means employed for clamping the body parts together employs special spring clamping devices 28. These devices may have a configuration substantially as shown in FIGURES 3 and 7 and are made of metal plate. For example, they can be made from metal plate by suitable punch press operations, or by torch cutting. The opposed parallel faces 29 of each clamping device are finished as by machining or grinding, whereby the unsprung distance between these faces is somewhat less than the thickness of the parts to be clamped, measuring from one exterior face to the other. To provide spring action, to facilitate initial application, the throat portion of the device is slotted at 30 to the cutout area 30a. Also, it is advisable to provide a cutaway area or recess 30b at the inner end of the slot. In practice, where a device is made from spring steel plates of say ⅜ inch in thickness, slot 30 can be of the order of 3/16 inch wide. After being driven over the parts to be clamped together, as by striking the central lug 28a, the device appears as in FIGURE 9. Thereafter a welding shield 31 or a backing bar is applied over one side of the slot, and by a simple welding operation, the slot is filled with weld metal 32 as shown in FIGURE 11. As the weld metal cools, it shrinks, thereby drawing the clamping surfaces 29 together to exert the desired clamping pressure. In some instances two such devices may be applied, side by side, as shown in FIGURES 9 and 10, with an intervening shield, with the welding operations being carried out successively.

As shown in FIGURES 3, 7 and 9, it is desirable for the clamping devices to be provided with pads 33 which engage the outer surface of the intermediate body part 12, thus aiding in promptly locating the intermediate body part, and in resisting outward deflection of the same.

In addition to the clamping devices 28, which are distributed about the body in the manner illustrated in FIGURE 1, I can employ supplemental clamping devices 34 of substantially the same construction, which clamp across the portions 24a of the supplemental plates 24 in the manner shown in FIGURE 4. Thus the devices 34 serve to clamp the adjacent portions of the body parts together, while at the same time aiding and maintaining a desired relationship between the supplemental plates 24 and the other body parts.

In the assembly of a valve body or like structure, some of my clamping devices can be applied without welding, to hold the parts together while other devices are being welded.

The bolt circle 35 illustrated in FIGURE 1 represents the bolt circle for an associated pipe coupling flange. For one part of this bolt circle, the threaded openings 36 are provided to receive clamping studs. For the remainder of the bolt circle openings 37 are provided which receive bolts of sufficient length to extend through the pipe coupling flanges and the entire assembly.

With respect to the clamping devices 28 and 34, they are distributed about the body in such a manner as to attain proper clamping forces for the line pressures for which the valve is designed. The edges of the body parts 11 can be provided with notches 38, which are engaged by the clamping devices, and which aid in their location. Assuming that the side body parts 11 are made from mill plate by a cutting torch, the trace path of the torch can be such as to form the notches during the plate cutout operation.

The sealing means between the gate and the body employs seat rings 39 that are carried by the body on both sides of the gate. Each seat ring is slightly thicker than the thickness of the associated body part 11, and the opening 40 on the associated body part is machined whereby the seat ring may be readily applied or removed and is self aligning with respect to the gate. The opposite sides of the seat ring are provided with the grooves or recesses to accommodate the seal rings 41 of the resilient type. Various types of seal rings can be employed for this purpose, including rings of the type disclosed in my copending application, Serial No. 43,396. One seal ring for each seat ring 39 establishes sealing contact with the adjacent side surface of the supplemental plate 24, and the other seal ring establishes sealing contact with respect to the valve gate.

It will be evident that the seat ring and the sealing feature described above is quite simple in its construction, particularly in that machining operations are simplified, and resilient sealing members are carried by the seat ring. The seat rings can be removed either through the body or directly from the body, after removing the supplemental plates 24.

In the valve embodiment of FIGURES 5 and 6, a different type of clamping means has been used in place of the simple clamping devices 34. Thus, clamping devices 42 are provided which are similar in construction to the clamping devices 34 of FIGURE 4. The ends of these clamping devices are connected by pivot pins 43, with the arms 44. At each side of the valve body, these arms are connected by the tension rods or bolts 46. The arms 44 have pads 47 that are adapted to engage and press upon the portions 24a of the supplemental plates 24. Thus, by applying a desired tension to the rods 46, the clamping devices 42 are clamped upon the assembled body, and at the same time clamping forces are applied to resist outward deflection of the sides of the body. A valve having a clamping device as just described is disclosed and claimed in my copending applications Ser. No. 131,802 filed August 16, 1961, and Ser. No. 149,648, filed November 2, 1961.

In the previously described embodiments, the valve side parts 11 are separated from the intermediate body part 12. However, if desired, the body part 12 can be an integral portion of one of the side parts. Thus, as shown in FIGURE 12, the side body part 11a is provided with an integral flange 12a, which takes the place of the separate body part 12. The body part 11b is the same as previously described, and is clamped upon the body part 11a by the spring clamping devices 28.

While I have described my clamping devices in conjunction with particular valve body constructions, it will be apparent that it has wide application for a variety of purposes. For example, it can be used in many applications in place of bolts or studs. In most instances, use of my clamping devices effects savings in machining and metal. If it is desired to remove my devices, they can be dislodged by hammer blows, and thereafter reapplied in the same location.

FIGURE 13 shows application of my clamping devices 45 to adjacent flanges 46 of the walls 47. This may, for example, represent a pressure vessel or other structure such as would normally be clamped together by bolts or studs. Note that flanges 46 may be relatively narrow compared to flanges that are drilled for bolts.

It will be evident from the foregoing that I have provided a clamping device which has wide application in various assemblies. It is not necessary that the clamps have machined faces 23 that are accurately spaced for parts of specified dimensions. This is because the spring action afforded by the open slots 30 permits the device to be driven in place, even though the spreading of the clamp may approach or slightly exceed its elastic limit. After the welding operation, clamping forces of predetermined magnitude are applied irrespective of variations in the extent to which the device is sprung during its application. After application and welding, the device may be removed by prying or hammer blows. Following removal a clamp can be reapplied by hammer impacts to the same place from which it was removed, and will again exert the desired clamping forces. In the manufacture and assembly of structures such as valve bodies, pressure vessels, or other assemblies, the features just described make possible a substantial latitude in dimensioning of the parts. Thus the parts to be clamped together may vary in thickness, without requiring clamping devices which vary in dimensions as originally constructed. Also, after factory assembly, welded clamping devices can be reapplied, assuming that care is taken to engage each device in the same place from which it was removed.

I claim:

1. In a valve construction, a valve body formed of separate side plate-like parts together with an intermediate part, said parts encompassing a valve body space, the body having aligned side openings for connection with associated piping, sealing means between the body parts, and C-type clamping devices for clamping the edge margins of the plate-like parts together upon the intermediate part, each of said devices comprising metal end portions engaging the exterior surfaces of the side plate-like parts adjacent the edges thereof and a metal throat portion connecting said end portions, the throat portion being of substantial width in a direction extending outwardly from the adjacent edge margins, an inner part only of said throat portion being interrupted by a slot that is bridged with weld metal, whereby said weld metal carries clamping forces in tension.

2. A valve construction as in claim 1 together with supplementary plate-like members surrounding the openings and engaging the outer surfaces of said plate-like body parts, and additional ones of said clamping devices engaging the edge margins of such supplemental plates and serving to clamp the same against the side plate-like parts.

References Cited in the file of this patent

UNITED STATES PATENTS

| | | |
|---|---|---|
| 856,546 | Pfeil | June 11, 1907 |
| 2,208,180 | Delleani | July 16, 1940 |
| 2,737,365 | Taylor | Mar. 6, 1956 |
| 2,775,805 | Sands | Jan. 1, 1957 |
| 2,776,813 | Blackman | Jan. 8, 1957 |
| 2,779,366 | McKenzie | Jan. 29, 1957 |
| 2,863,631 | Boteler | Dec. 9, 1958 |
| 2,982,514 | Bryant | May 2, 1961 |

FOREIGN PATENTS

| | | |
|---|---|---|
| 471,417 | Great Britain | Sept. 6, 1937 |
| 1,002,580 | Germany | Feb. 14, 1957 |
| 1,054,800 | Germany | Apr. 9, 1959 |